(12) United States Patent
Lee

(10) Patent No.: US 7,996,039 B2
(45) Date of Patent: Aug. 9, 2011

(54) METHOD FOR RESELLING CONTENT

(75) Inventor: Dong-Kyu Lee, Puchon-shi (KR)

(73) Assignee: Samsung Electronics Co., Ltd. (KR)

( * ) Notice: Subject to any disclaimer, the term of this patent is extended or adjusted under 35 U.S.C. 154(b) by 912 days.

(21) Appl. No.: 10/776,118

(22) Filed: Feb. 11, 2004

(65) Prior Publication Data

US 2004/0162053 A1    Aug. 19, 2004

(30) Foreign Application Priority Data

Feb. 19, 2003  (KR) .................. 10-2003-0010349

(51) Int. Cl.
*H04B 1/38*          (2006.01)
(52) U.S. Cl. ................... 455/557; 455/414.1; 455/556.1
(58) Field of Classification Search .............. 455/414.1, 455/557, 556.1

See application file for complete search history.

(56) References Cited

U.S. PATENT DOCUMENTS

| 6,209,787 B1* | 4/2001 | Iida ............................... 235/381 |
| 7,505,935 B2* | 3/2009 | Mendiola et al. ............... 705/37 |
| 2004/0111341 A1* | 6/2004 | Aikoh et al. .................... 705/35 |

FOREIGN PATENT DOCUMENTS

| KR | 20020035077 | 5/2002 |
| KR | 20020044254 | 6/2002 |
| KR | 20020058016 | 7/2002 |

* cited by examiner

*Primary Examiner* — Temica M Beamer
(74) *Attorney, Agent, or Firm* — The Farrell Law Firm, P.C.

(57) ABSTRACT

Disclosed is a method for reselling content. The method comprises receiving sale information for particular content to be resold from a seller terminal in reply to a request by a seller who wishes to resell the content over a communication network, and registering the corresponding content as secondhand content; providing the corresponding secondhand content to a buyer terminal in reply to a request by a buyer who wishes to buy the secondhand content, and transmitting sale information for the secondhand content to the seller terminal; and paying a sale price for the secondhand content to the seller after charging a fee for the secondhand content to the buyer.

15 Claims, 5 Drawing Sheets

| CONTENT D | (200) |
|---|---|
| ID | (210) |
| NAME | (220) |
| PRODUCER | (230) |
| SIZE | (240) |
| DATA | (250) |

FIG.4A

| SALE MANAGEMENT DB | (300) |
|---|---|
| ID | (310) |
| SALE PRICE | (320) |
| REPLAY RIGHT INFO | (330) |

FIG.4B

| SECONDHAND CONTENT DB | (400) |
|---|---|
| ID | (410) |
| RESIDUAL REPLAY INFO | (420) |
| SALE PRICE | (430) |
| SELLER INFO | (440) |

FIG.5A

| SECONDHAND CONTENT DB | (500) |
|---|---|
| ID | (510) |
| RESIDUAL REPLAY INFO | (520) |
| SALE PRICE | (530) |
| SELLER INRO | (540) |
| DATA | (550) |

| ID (610) | NAME (620) | USER INFO (630) | RESIDUAL REPLAY INFO (640) | SIZE (650) | DATA (660) |
|---|---|---|---|---|---|

FIG.6

METHOD FOR RESELLING CONTENT

PRIORITY

This application claims priority under 35 U.S.C. §119 to an application entitled "Method for Reselling Contents" filed in the Korean Industrial Property Office on Feb. 19, 2003 and assigned Serial No. 2003-10349, the contents of which are incorporated herein by reference.

BACKGROUND OF THE INVENTION

1. Field of the Invention

The present invention relates generally to a method for reselling content, and in particular, to a method for reselling content over a mobile communication network.

2. Description of the Related Art

Recently, the use of content over a communication apparatus such as a mobile terminal and a personal computer (PC) has been increasing rapidly. As a result, a content market where content is transacted over a communication network such as a mobile communication network and the Internet has been extending widely.

FIG. 1 illustrates a schematic procedure for a common content transaction procedure. Specifically, FIG. 1 illustrates a content transaction procedure generally performed between a mobile terminal 10 and a content providing server 20. Referring to FIG. 1, if a subscriber of a mobile communication network wishing to buy particular content accesses the server 20 using the terminal 10 and then requests to purchase corresponding content in (Step S10), the server 20 provides the corresponding content to the terminal 10 (Step S20) and then charges a fee for the content (Step S30). The terminal 10 then pays the fee for the corresponding content to the server 20 (Step S40). Commonly, the fee for the corresponding content is added to a fee for a mobile communication service charged by a mobile communication service provider. A user of the terminal 10 then pays the fee for the mobile communication service, including the fee for the content, to the mobile communication service provider.

However, such content is available only while the corresponding content is stored in the corresponding terminal. That is, if the user deletes the content from the corresponding terminal after using the corresponding content, he or she loses the right to use the content.

If the user, after buying content that can be used for a predetermined term or a predetermined number of times, deletes or discards the content before expiration of their valid term or before exceeding the predetermined number of uses, due to any reasons, a residual right to use the content lapses automatically. In this case, the user, who bought the paid content having limited right of use, will unexpectedly waste a portion of the expenses paid for the residual use out of a total amount of money paid when buying the content.

SUMMARY OF THE INVENTION

It is, therefore, an object of the present invention to provide a content reselling method for enabling a user to recover expenses for a residual right to use paid content left over at the time when the paid content are deleted or discarded.

It is another object of the present invention to provide a content reselling method for providing users using content over a mobile apparatus and content providers with a way to make profit from reselling content.

It is further another object of the present invention to provide a content reselling method for activating a mobile apparatus-based content market.

To achieve the above and other objects, there is provided a method for reselling content. The method comprises receiving sale information for particular content to be resold from a seller terminal in reply to a request by a seller who wishes to resell the content over a communication network, and registering the corresponding content as secondhand content; providing the corresponding secondhand content to a buyer terminal in reply to a request by a buyer who wishes to buy the secondhand content, and transmitting sale information for the secondhand content to the seller terminal; and paying a lower price for the secondhand content to the seller after charging a fee for the secondhand content to the buyer.

BRIEF DESCRIPTION OF THE DRAWINGS

The above and other objects, features and advantages of the present invention will become more apparent from the following detailed description when taken in conjunction with the accompanying drawings in which:

FIGS. 4A and 4B illustrate structures of common databases for managing content in a content providing server;

FIGS. 5A and 5B illustrate structures of databases for managing secondhand content for content reselling according to the first and second embodiments of the present invention, respectively; and FIG. 6 illustrates a format of content data exchanged between a secondhand server and a terminal for content reselling according to the first and second embodiments of the present invention.

DETAILED DESCRIPTION OF THE PREFERRED EMBODIMENT

Figure 1:
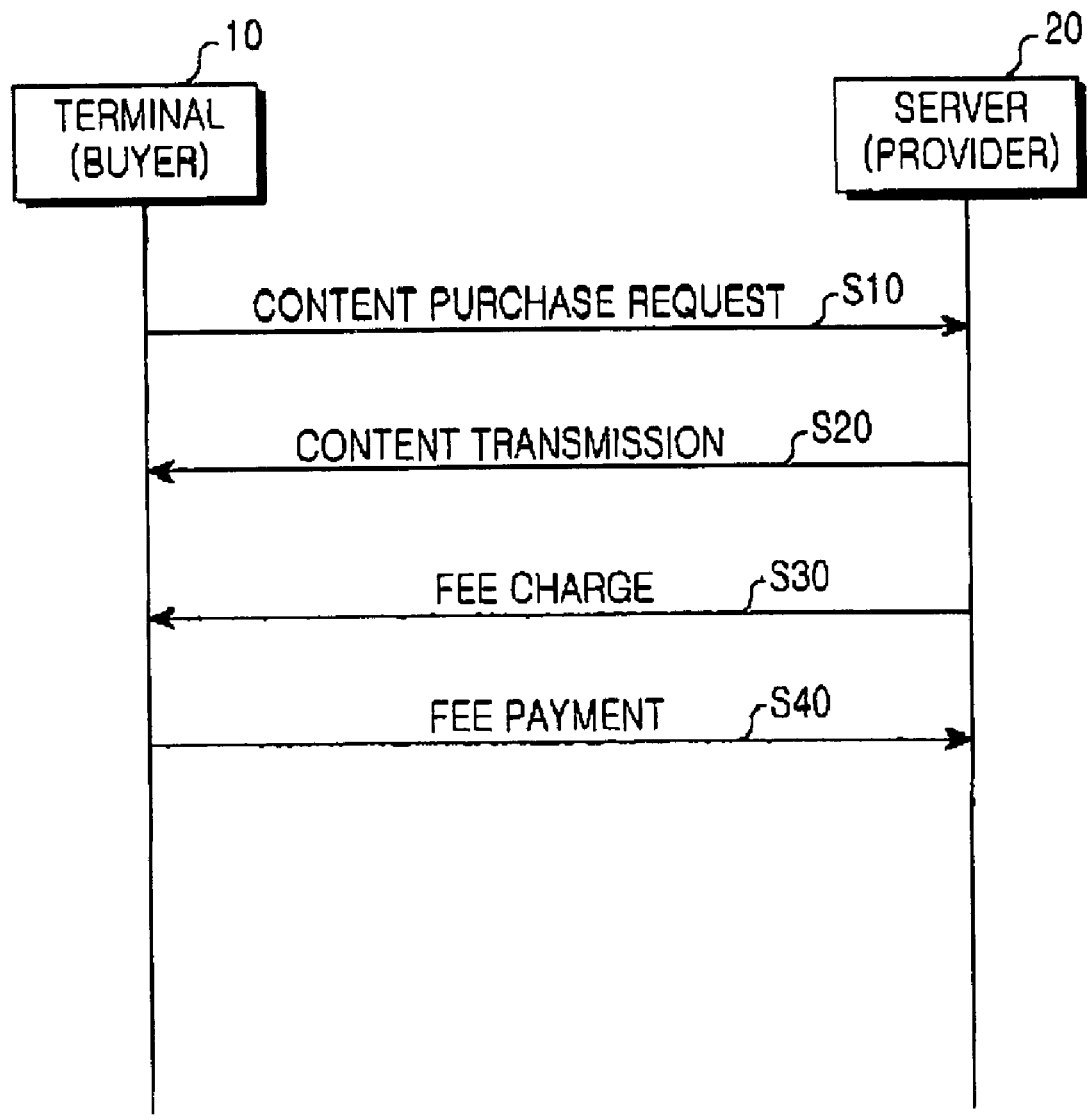
FIG. 1 illustrates a schematic of a procedure for a common content transaction procedure of prior art.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

Figure 2:
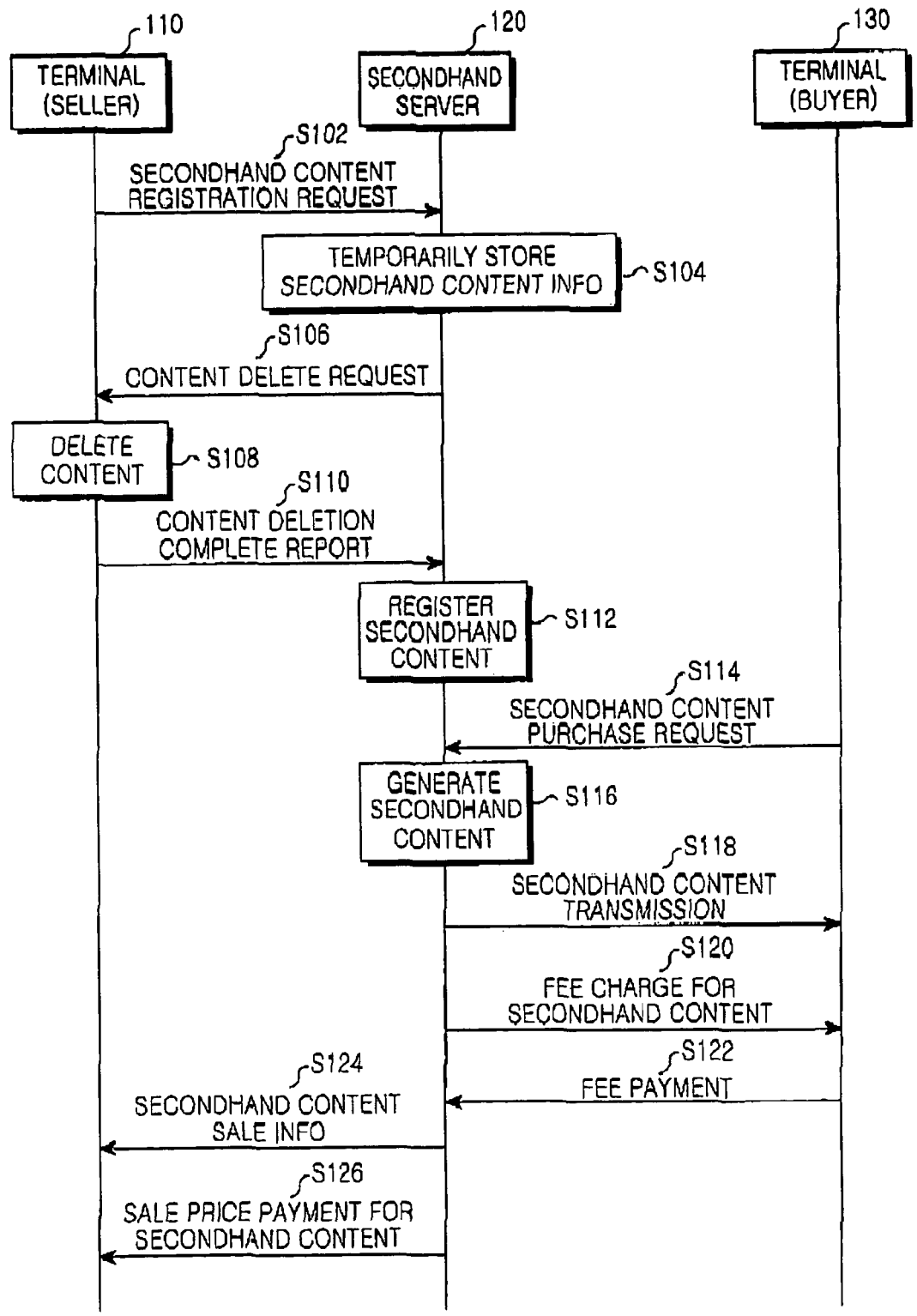
FIG. 2 illustrates a procedure for a content reselling method according to a first embodiment of the present invention.

FIG. 2 illustrates a procedure for a content reselling method according to a first embodiment of the present invention. In FIG. 2, it is assumed that the makeup of a server (content server) that initially provided content is identical to a server 120 (secondhand server) that resells the content.

Referring to FIG. 2, a content reselling method according to a first embodiment of the present invention includes a secondhand content registration process (Steps S102 to S112), a secondhand content sale process (Steps S114 to S122), and a sale result handling process (Steps S124 to S126). That is, in the case where a user (seller) who bought particular content from a content server over his or her terminal wishes to resell the purchased content according to the first embodiment of the present invention, the user accesses a secondhand server 120 using a terminal 110 in which the content is stored, and then registers content (or secondhand content) that he or she wishes to resell, in the secondhand server 120 (Steps S102 to S112). The secondhand server 120 then handles a request by a buyer (terminal 130) who wishes to buy secondhand content (Steps S114 to S122), and delivers the results to the seller (terminal 110) (Steps S124 and 126).

The procedure stated above will be described in detail herein below. First, a terminal 110 that wishes to sell secondhand content transmits secondhand content information to a secondhand server 120 and requests registration of the secondhand content (Step S102). That is, the terminal 110 transmits, to the secondhand server 120, secondhand content information including an identification number (ID) of the content that the terminal 110 wishes to resell, a residual right to use the content (e.g., the residual number of replays and a residual valid replay term), a sale price, and seller information. The content ID and the residual use right, included in the secondhand content information, are extracted from previously stored content information, and the sale price and the seller information, included in the secondhand content information, are input by a user. Therefore, a user of the terminal 110 can request registration of content that he or she wishes to sell by selecting the content, inputting a sale price for the corresponding content and user information, and then selecting 'Secondhand Content Registration' by key manipulation. If a phone number of the corresponding terminal 110 is set as the user information, the user inputs only the sale price. Terminals 110 and 130 as well as the server 120 may be computing devices having input peripherals such as keyboard and/or telephone keypads, etc. Other types of data entry peripherals activated by voice and writing may also be used. Furthermore, they may include memory, disk storage, and communication devices.

If the terminal 110 requests secondhand content registration in this way (Step S102), the secondhand server 120 temporarily stores the corresponding content information (Step S104), and requests the terminal 110 to delete the corresponding content (Step S106). In reply to the deletion request, the terminal 110 deletes the corresponding content (Step S108), and sends a content deletion complete report to the secondhand server 120 (Step S110). The secondhand server 120 then registers the secondhand content information temporarily stored in step S104 in a secondhand content database (DB) (Step S112).

FIG. 5A illustrates a structure of a database for managing secondhand content for content reselling according to the first embodiment of the present invention. Specifically, FIG. 5A illustrates a structure of a secondhand content database DB 400 for managing, by a secondhand server, information registered as secondhand content for the case where a content server is identical to the secondhand server.

Referring to FIG. 5A, the secondhand content DB 400 includes an ID field 410, a residual replay information field 420, a sale price field 430, and a seller information field 440. The ID field 410 stores an identification number of the content to be resold, and the residual replay information field 420 stores residual replay information (or residual use right information) for the corresponding content. Further, the sale price field 430 stores secondhand sale price information for the corresponding content, and the seller information field 440 stores information (e.g., phone number) of the user who wishes to sell the corresponding content.

Particularly, the residual replay information field 420 stores information determined by subtracting as much replay information as an amount used by the corresponding user from replay information (e.g., the number of replays and a valid replay term) at the time when the user bought the corresponding content. For example, if the number of possible replays at the time when the user bought the corresponding content is 100 and the user has used the content 50 times, then the residual replay information field 420 stores '50'. To continue with this example, instead of purchasing a content, e.g., a song or a computer program, outright, a buyer may purchase the right to use or play that content 50 times. Therefore the present invention may be analogized to subleasing. If a right to use the corresponding content was unlimited at initial sale, the residual replay information field 420 will store relevant information (e.g., 'Unlimited') for representing the unlimited right.

The secondhand content DB 400, as shown in the drawing, stores no actual data information for the corresponding content, because in this case the secondhand server is identical to the content server. That is, a common content server manages content in a database having the structure illustrated in FIG. 4A, and if an ID of the secondhand content DB 400 is identical to an ID of a content DB 200 illustrated in FIG. 4A, actual data information for the corresponding content can be determined by the ID 210. Therefore, actual data information for the corresponding content is not stored in the secondhand content DB 400.

Meanwhile, a sale management DB 300 illustrated in FIG. 4B is an example of a database for managing initial sale information for the corresponding content. A sale price field 320 of the sale management DB 300 stores initial sale price information for content corresponding to an ID stored in an ID field 310, and a replay right information field 330 stores initial replay right information for the corresponding content.

Referring back to FIG. 2, after registering information for the secondhand content through the process of steps S102 to S112, the secondhand server 120 provides users with sale information for the secondhand content in a predetermined form. For example, the secondhand server 120 provides name, residual use right information and sale price information of the secondhand content to all terminals that have accessed the secondhand server 120 (this step is not shown). Thereafter, the secondhand server 120 waits for a particular terminal to buy the secondhand content.

If a user (buyer) wishing to buy the secondhand content accesses the secondhand server 120 using the terminal 130 and then sends a secondhand content purchase request for particular content to the secondhand server 120 by searching secondhand content information (Step S114), the secondhand server 120 generates secondhand content by combining secondhand content information stored in the secondhand content DB 400, content data stored in the content DB 200 with information (e.g., phone number) of the buyer (Step S116), and provides the generated secondhand content to the corresponding terminal 130 (Step S118). Further, the secondhand server 120 charges a fee for the corresponding content to the buyer (terminal 130) (Step S120). If the buyer (terminal 130) pays a corresponding fee (Step S122), the secondhand server 120 provides secondhand content information for the corresponding content to the seller (terminal 110) (Step S124). Thereafter, the secondhand server 120 provides the seller (terminal 110) with an amount of money determined by subtracting a predetermined commission from the fee for the content paid by the buyer (terminal 130) (Step S126). Although the procedure of FIG. 2 has been described with reference to an embodiment where the secondhand server provides sale information to the seller and pays the sale price after a fee for the secondhand content is paid in full by the buyer, the time for providing the sale information and paying the sale price is subject to change. For example, the secondhand server 120 may also previously provide sale information to the seller (terminal 110) before charging the fee for the secondhand content after providing the buyer (terminal 130) with the secondhand content.

In addition, the method for paying the sale price to the seller (terminal 110) by the secondhand server 120 can be applied in various ways. For example, the secondhand server 120 can allow the seller to enjoy a free call for a predetermined time period over the corresponding terminal 110 where the terminal 110 is a telephone, provide cyber money, or remit money to a bank account for the user of the corresponding terminal 110.

Figure 3:
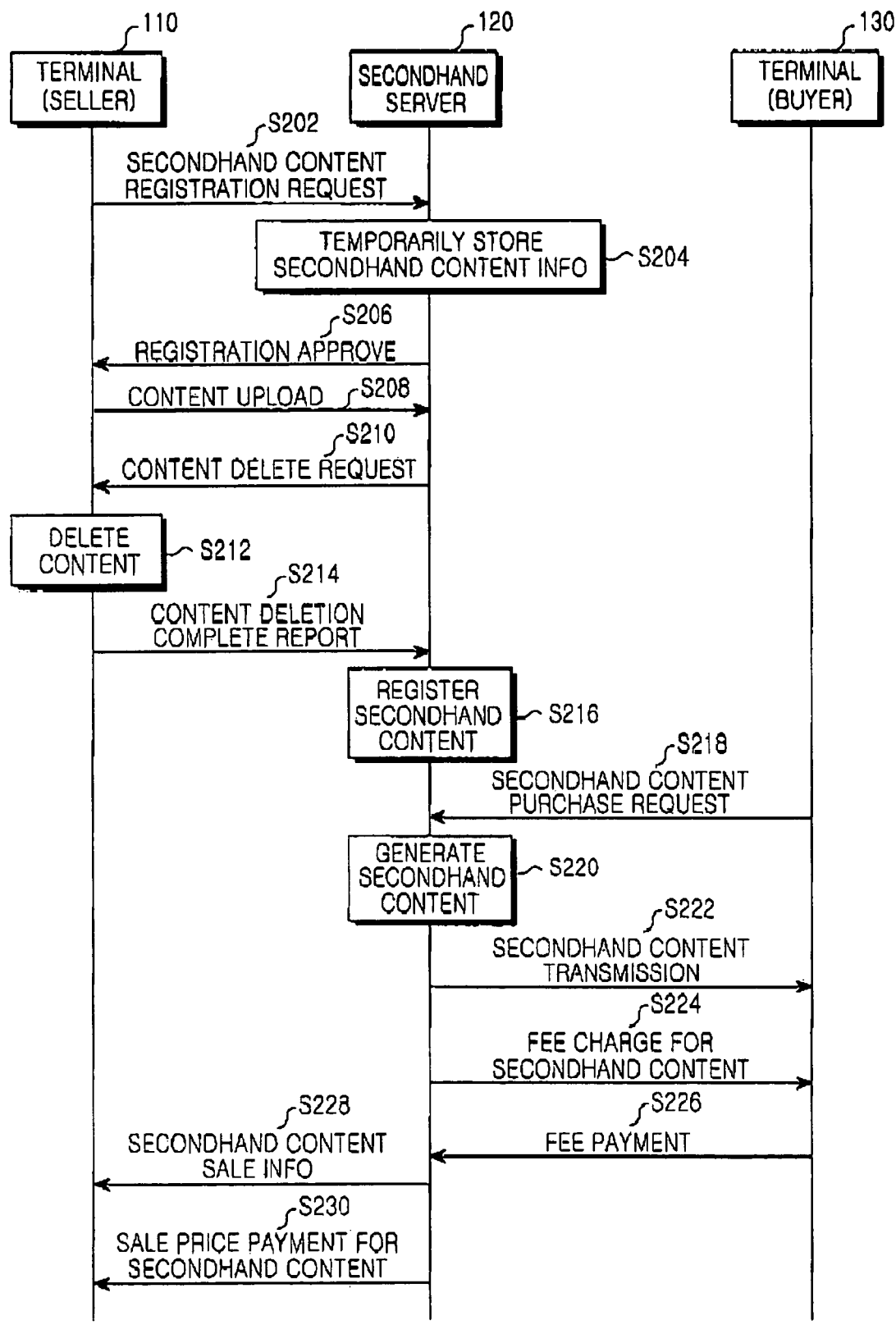
FIG. 3 illustrates a procedure for a content reselling method according to a second embodiment of the present invention.

FIG. 3 illustrates a procedure for a content reselling method according to a second embodiment of the present invention. In FIG. 3, it is assumed that a server (content server) that initially provided content is different from a server (secondhand server) that resells the content. Compared with the content reselling method illustrated in FIG. 2, the content reselling method illustrated in FIG. 3 further includes a process of uploading content to be resold, by a terminal that desires to resell the content. This is because the content reselling method illustrated in FIG. 3 is performed for the case where the content server is different from the secondhand server, so the content to be resold is not stored in the secondhand server.

Referring to FIG. 3, a content reselling method according to a second embodiment of the present invention includes a secondhand content registration process (Steps S202 to S216), a secondhand content sale process (Steps S218 to S226), and a sale result handling process (Steps S228 to S230). That is, in the case where a user (seller) who bought particular content from a content server using a terminal 110 wishes to resell the content according to the second embodiment of the present invention, the user accesses a secondhand server 125 using a terminal 110 in which the content are stored, and then registers content (secondhand content) that he or she wishes to resell, in the secondhand server 125 (Steps S202 to S216). The secondhand server 125 then handles a request by a buyer (terminal 130) who wishes to buy secondhand content (Steps S218 to S226), and delivers the results to the seller (terminal 110) (Steps S228 and S230).

The procedure stated above will be described in detail herein below. First, a terminal 110 that wishes to sell secondhand content transmits secondhand content information to a secondhand server 125 and requests registration of the secondhand content (Step S202). That is, the terminal 110 transmits, to the secondhand server 125, secondhand content information including an identification number (ID) of the content that the terminal 110 wishes to resell, a residual right to use the content (e.g., the residual number of replays and a residual valid replay term), a file size of the corresponding content, a sale price, and seller information. The content ID, the residual use right and the file size of the corresponding size, included in the secondhand content information, are extracted from previously stored content information, and the sale price and the seller information, included in the secondhand content information, are input by a user. Therefore, a user of the terminal 110 can request registration of content that he or she wishes to sell by selecting the content, inputting a sale price for the corresponding content and user information (or seller information), and then selecting 'Secondhand Content Registration' by key manipulation. If a phone number of the corresponding terminal 110 is set as the seller information, the user is allowed to input only the sale price.

If the terminal 110 requests registration of secondhand content (Step S202) in the manner stated above, the secondhand server 125 temporarily stores the corresponding content information (Step S204), and transmits a registration approve message to the terminal 110 (Step S206). The registration approval message is a message for permitting the terminal 110 to start content uploading. Upon receiving the registration approve message, the terminal 110 uploads the content to be resold to the secondhand server 125 (Step S208).

After the content are completely uploaded, the secondhand server 125 requests the terminal 110 to delete the uploaded content (Step S210). In reply to the request, the terminal 110 deletes the corresponding content (Step S212), and then sends a content deletion complete report to the secondhand server 125 (Step S214). After receiving the content deletion complete report from the terminal 110, the secondhand server 125 registers the corresponding content and its secondhand content information in a secondhand content DB, as requested by the terminal 110 (Step S216).

FIG. 5B illustrates a structure of a database for managing secondhand content for content reselling according to the second embodiment of the present invention. Specifically, FIG. 5B illustrates a structure of a secondhand content database DB 500 for managing, by a secondhand server, information registered as secondhand content and the corresponding content for the case where a content server is different from the secondhand server.

Referring to FIG. 5B, the secondhand content DB 500 includes an ID field 510, a residual replay information field 520, a sale price field 530, a seller information field 540, and a data field 550. That is, compared with the secondhand content DB illustrated in FIG. 5A, the secondhand content DB 500 further includes the data field 550. The data field 550 stores actual data information of the content to be resold.

Referring again to FIG. 3, after registering information for the secondhand content and the content data through the process of steps S202 to S216, the secondhand server 125 provides users with sale information for the secondhand content in a predetermined form. A detailed form of the sale information is similar to that is described above in conjunction with the first embodiment, therefore a description thereof will not be repeated.

If a user (buyer) wishing to buy the secondhand content accesses the secondhand server 125 using the terminal 130 and then sends a secondhand content purchase request for particular content to the secondhand server 125 by searching secondhand content information (Step S218), the secondhand server 125 performs a secondhand content sale process and a sale result handling process through a procedure similar to that described in conjunction with the first embodiment illustrated in FIG. 2 (Steps S220 to S230). That is, the secondhand server 125 generates secondhand content to be provided to the terminal 130 based on secondhand content information stored in the secondhand content DB 500 and information (e.g., phone number) of the terminal 130 in response to the secondhand content purchase request from the terminal 130 (Step S220), and provides the generated secondhand content to the terminal 130 (Step S222). Further, the secondhand server 125 charges the buyer (terminal 130) a fee for the corresponding content (Step S224). If the buyer (terminal 130) pays a corresponding fee (Step S226), the secondhand server 125 provides sale information for the corresponding secondhand content to the seller (terminal 110) (Step S228). Thereafter, the secondhand server 125 provides the seller (terminal 110) with an amount of money determined by subtracting a predetermined commission from the fee for the content paid by the buyer (terminal 130) (Step S230).

Although the procedure of FIG. 3 has been described with reference to a case where the secondhand server 125 provides sale information to the seller (terminal 110) and pays the sale price after a fee for the secondhand content is paid in full by the buyer, the time for providing the sale information and paying the sale price is subject to change. In addition, the method for paying the sale price to the seller (terminal 110) by the secondhand server 125 can be applied in various ways. The time and method for providing the sale information and paying the sale price have been described in detail with reference to FIG. 2.

FIG. 6 illustrates a format of data 600 exchanged between a secondhand server and a terminal for content reselling according to the first and second embodiments of the present invention.

Referring to FIG. 6, data 600 includes an ID field 610, a name field 620, a user information field 630, a residual replay information field 640, a size field 650, and a data field 660. Content stored in each field are identical to the content stored in the corresponding fields in the database structures illustrated in FIGS. 5A and 5B. The user information field 630 stores a different value according to a state of the corresponding data. For example, if data 600 is transmitted from a server to a terminal, the user information field 630 stores user information (e.g., phone number) of the buyer, and if data 600 is transmitted from a terminal to a server, the user information field 630 stores user information (e.g., phone number) of the seller. In the case where data 600 is stored in a terminal, the terminal may delete the data stored in the user information field 630. This is because a phone number of the corresponding terminal, to be stored in the user information field 630, was previously stored in an internal memory of the terminal.

As can be understood from the foregoing description, the proposed content reselling method according to the present invention enables a user to collect the fee for a residual use right that is left over at the time when the paid for content is deleted or discarded, so the user does not lose the fee paid for the residual use right out of an amount of money paid when he or she bought the corresponding content. In addition, a user of a mobile apparatus, such as a cell phone, can make profits through the use of such mobile apparatus by reselling the content that he or she bought for use on the mobile apparatus, and a content provider can also make additional profits by imposing a commission on such resale. Further, users buying the secondhand content can purchase the corresponding content at a low price and in turn resell.

Furthermore, even for sold content (e.g., music disc), as a user who has previously bought and stored the corresponding content can resell its residual use rights of such content, a person who wants the content may purchase the corresponding content at will.

Finally, the present invention can activate a mobile apparatus-based content market.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for reselling content, comprising the steps of:
   (a) receiving, by a content server, content information for particular content to be resold from a seller terminal in reply to a request by a seller who wishes to resell the content over a communication network, and registering a content corresponding to the content information in a database as secondhand content; and
   (b) in reply to a request by a buyer to buy the secondhand content, searching for corresponding secondhand content and providing, by the content server, corresponding secondhand content to a buyer terminal, and transmitting sale information for the secondhand content to the seller terminal.

2. The method of claim 1, further comprising the step of (c) paying a sale price for the secondhand content to the seller after charging a fee for the secondhand content to the buyer.

3. The method of claim 1, wherein step (a) comprises the steps of:
   (a-1) receiving, from the seller terminal, sale information including an identification number of content to be resold, a residual use right, a sale price and seller information, and temporarily storing the sale information;
   (a-2) requesting the seller terminal to delete the corresponding content; and
   (a-3) registering the corresponding content as the secondhand content upon receiving a deletion complete report for the corresponding content from the seller terminal.

4. The method of claim 3, wherein the secondhand content registered in step (a-3) includes a content identification number, a residual use right, a sale price, and seller information.

5. The method of claim 1, wherein step (a) comprises the steps of:
   (a-4) receiving, from the seller terminal, sale information including an identification number of content to be resold, a residual use right, a file size, a sale price and seller information and temporarily storing the sale information;
   (a-5) requesting the seller terminal to upload corresponding content data;
   (a-6) requesting the seller terminal to delete the corresponding content if the content data is completely uploaded; and
   (a-7) registering the content as the secondhand content upon receiving a deletion complete report for the corresponding content from the seller terminal.

6. The method of claim 5, wherein the secondhand content registered in step (a-7) includes a content identification number, a residual use right, a sale price, seller information, and content data.

7. The method of claim 1, wherein step (b) comprises the steps of:
   (b-1) generating secondhand content data based on the sale information and the buyer information of the registered secondhand content in reply to a request by the buyer; and
   (b-2) transmitting the secondhand content to the buyer terminal.

8. The method of claim 2, wherein step (c) comprises the step of paying to the seller an amount of money determined by subtracting a predetermined commission from a fee for the secondhand content paid by the buyer.

9. A method for reselling content, comprising the steps of:
   (a) receiving, by a content server, content information for content to be resold from a seller terminal in reply to a request by a seller who wishes to resell particular content over a communication network, and registering a content corresponding to the content information in a database as secondhand content;
   (b) in reply to a request by a buyer to buy the secondhand content, searching for corresponding secondhand content and providing the corresponding secondhand content to a buyer terminal, and charging a fee for the secondhand content to the buyer;
   (c) in reply to the request by the buyer to buy the secondhand content, transmitting sale information for the secondhand content to the seller terminal; and (d) paying a sale price for the secondhand content to the seller.

10. The method of claim 9, wherein step (a) comprises the steps of:
- (a-1) receiving, from the seller terminal, sale information including an identification number of content to be resold, a residual use right, a sale price, and seller information, and temporarily storing the sale information;
- (a-2) requesting the seller terminal to delete corresponding content; and
- (a-3) registering the content as the secondhand content upon receiving a deletion complete report for the corresponding content from the seller terminal.

11. The method of claim 10, wherein the secondhand content registered in step (a-3) includes a content identification number, a residual use right, a sale price, and seller information.

12. The method of claim 9, wherein step (a) comprises the steps of:
- (a-4) receiving, from the seller terminal, sale information including an identification number of content to be resold, a residual use right, a file size, a sale price, and seller information, and temporarily storing the sale information;
- (a-5) requesting the seller terminal to upload corresponding content data;
- (a-6) requesting the seller terminal to delete the content data if the content data is completely uploaded; and
- (a-7) registering the content as the secondhand content upon receiving a deletion complete report for the corresponding content from the seller terminal.

13. The method of claim 12, wherein the secondhand content registered in step (a-7) includes a content identification number, a residual use right, a sale price, seller information, and content data.

14. The method of claim 9, wherein step (b) comprises the steps of:
- (b-1) generating secondhand content data based on the sale information and the buyer information of registered secondhand content in reply to a request by the buyer; and
- (b-2) transmitting the secondhand content to the buyer terminal.

15. The method of claim 9, wherein step (d) comprises the step of paying to the seller an amount of money determined by subtracting a predetermined commission from a fee for the secondhand content paid by the buyer.

* * * * *